(12) United States Patent
Rising, III et al.

(10) Patent No.: US 7,870,483 B2
(45) Date of Patent: Jan. 11, 2011

(54) ENCODING AND DISTRIBUTION OF SCHEMA FOR MULTIMEDIA CONTENT DESCRIPTIONS

(75) Inventors: Hawley K. Rising, III, San Jose, CA (US); Ali Tabatabai, Cupertino, CA (US); Mohammed Z. Visharam, Santa Clara, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 853 days.

(21) Appl. No.: 11/805,942

(22) Filed: May 25, 2007

(65) Prior Publication Data

US 2007/0234192 A1 Oct. 4, 2007

Related U.S. Application Data

(62) Division of application No. 10/090,254, filed on Mar. 1, 2002, now Pat. No. 7,240,285.

(60) Provisional application No. 60/273,219, filed on Mar. 1, 2001.

(51) Int. Cl.
*G06F 17/00* (2006.01)
(52) U.S. Cl. ..................... 715/249; 715/236
(58) Field of Classification Search ............. 715/249, 715/250, 234, 235, 236, 237, 239; 707/601, 707/602, 760, 803, 807
See application file for complete search history.

(56) References Cited

U.S. PATENT DOCUMENTS

| 5,579,471 | A | | 11/1996 | Barber et al. | |
|---|---|---|---|---|---|
| 5,870,739 | A | * | 2/1999 | Davis et al. | 1/1 |
| 5,963,934 | A | * | 10/1999 | Cochrane et al. | 1/1 |
| 6,009,428 | A | * | 12/1999 | Kleewein et al. | 1/1 |
| 6,385,604 | B1 | * | 5/2002 | Bakalash et al. | 1/1 |
| 6,492,998 | B1 | | 12/2002 | Kim et al. | |
| 6,496,591 | B1 | | 12/2002 | Rhoads | |
| 6,675,169 | B1 | * | 1/2004 | Bennett et al. | 1/1 |

(Continued)

OTHER PUBLICATIONS

Girardot, Marc, et al, "Mullau: An Encoding Format for Efficient Representation and Exchange of XML Over the Web", Computer Networks, vol. 33, Issues 1-6, Jun. 2000, pp. 747-765.*

(Continued)

*Primary Examiner*—Laurie Ries
(74) *Attorney, Agent, or Firm*—Blakely, Sokoloff, Taylor & Zafman LLP

(57) ABSTRACT

The encoding and distribution of schema for multimedia content descriptions are described. Before the schema is sent to a system for use, it is encoded by assigning a first token for each component in the schema and a second token for each attribute of each component. In one aspect, a signifier is sent first to signal that the schema is to be sent in a particular format. In one aspect, the schema is sent as a whole entity first. In another aspect, some of the components of the schema are sent first, followed by the schema that refers to these components. In another aspect, the schema is sent first, followed by a set of component types. When the decoder receives the signifier and encoded schema, it looks up values for the first and second tokens in a look up table for all components and attributes to decode the schema.

22 Claims, 11 Drawing Sheets

U.S. PATENT DOCUMENTS

| | | |
|---|---|---|
| 6,681,315 B1 | 1/2004 | Hilts et al. |
| 6,931,532 B1 * | 8/2005 | Davis et al. ................. 713/167 |
| 6,978,367 B1 * | 12/2005 | Hind et al. .................. 713/167 |
| 7,007,105 B1 * | 2/2006 | Sullivan et al. ............. 709/247 |
| 2003/0197719 A1 | 10/2003 | Lincke et al. |
| 2004/0107356 A1 * | 6/2004 | Shamoon et al. ............ 713/193 |

OTHER PUBLICATIONS

Rehm, Eric, "Representing Internet Streaming Media Metadata Using MPEG-7 Multimedia Description Schemes", Proceedings of the 2000 ACM on Multimedia, Nov. 2000, pp. 93-98.

Fraternali, Piero, et al., "Model-Driven Development of Web Applications: The AutoWeb System", ACM Transactions on Information Systems (TOIS), vol. 18, Issue 4, Oct. 2000, pp. 323-382.

* cited by examiner

```
<schema xmlns="http://www.w3.org/2000/10/XMLSchema"
 xmlns:mpeg7="http://www.mpeg7.org/2001/MPEG-7_Schema"
 targetNamespace="http://www.mpeg7.org/2001/MPEG-7_Schema">

<complexType name="Mpeg7MainType">
    <complexContent>
        <extension base="mpeg7:Mpeg7RootType"/>
    </complexContent>
</complexType>
</schema>
```

Figure 7

| Component | Constraint | Text-Value |
|---|---|---|
| schema [000101] [v1] | xmlns [xxxx] | http://www.w3.org/2000/10/XMLSchema |
| ..._Schema [v2] | xmlns [xxxx] | http://www.mpeg7.org/2001/mpeg-7... |
| ..._Schema [v3] | targetNamespace [xxxx] | http://www.mpeg7.org/2001/mpeg-7... |
| complexType [000111] | name [xxxx] | Mpeg7MainType [v4] |
| complexContent [011010] | | |
| extension [011101] | base [xxx] | mpeg7:Mpeg7RootType [v5] | end tag for extension, complexContent, complexType
 [111110, 111110, 111110]
end tag for schema [111111]

Figure 8

ENCODING AND DISTRIBUTION OF SCHEMA FOR MULTIMEDIA CONTENT DESCRIPTIONS

RELATED APPLICATIONS

This is a divisional application of U.S. patent application Ser. No. 10/090,254, filed Mar. 1, 2002 now U.S. Pat. No. 7,240,285, which claims priority to the following U.S. Provisional Patent Application, Ser. No. 60/273,219, titled "AN EFFICIENT METHOD FOR THE BINARIZATION OF SCHEMA DOCUMENTS", and filed Mar. 1, 2001.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Sony Electronics, Inc., All Rights Reserved.

FIELD OF THE INVENTION

This invention relates generally to schema for multimedia content descriptions, and more particularly to the encoding and distribution of the schema.

BACKGROUND

Using a movie as an example, a corresponding MPEG-7 content description would contain "descriptors" (D), which are components that describe the features of the movie, such as scenes, titles for scenes, shots within scenes, time, color, shape, motion, and audio information for the shots. The content description would also contain one or more "description schemes" (DS), which are components that describe relationships among two or more descriptors and/or description schemes, such as a shot description scheme that relates together the features of a shot. A description scheme can also describe the relationship among other description schemes, and between description schemes and descriptors, such as a scene description scheme that relates the different shots in a scene, and relates the title feature of the scene to the shots.

MPEG-7 uses a Data Definition Language (DDL) that specifies the language for defining the standard set of description tools (DS, D) and for defining new description tools and provides a core set of descriptors and description schemes. The DDL definitions for a set of descriptors and description schemes are organized into "schemas" for different classes of content. The DDL definition for each descriptor in a schema specifies the syntax and semantics of the corresponding feature. The DDL definition for each description scheme in a schema specifies the structure and semantics of the relationships among its children components, the descriptors and description schemes. The DDL may be used to modify and extend the existing description schemes and create new description schemes and descriptors.

The MPEG-7 DDL is based on XML (extensible markup language) and the XML Schema standards. The descriptors, description schemes, semantics, syntax, and structures are represented with XML elements and XML attributes. Some of the XML elements and attributes may be optional.

The MPEG-7 content description for a particular piece of content is defined as an instance of an MPEG-7 schema; that is, it contains data that adheres to the syntax and semantics defined in the schema. The content description is encoded in an "instance document" that references the appropriate schema. The instance document contains a set of "descriptor values" for the required elements and attributes defined in the schema, and for any necessary optional elements and/or attributes. For example, some of the descriptor values for a particular movie might specify that the movie has three scenes, with scene one having six shots, scene two having five shots, and scene three having ten shots. The instance document may be encoded in a textual format using XML, or in a binary format, such as the binary format specified for MPEG-7 data, known as "BiM," or a mixture of the two formats.

Transmitting schema for multimedia content descriptions can be cumbersome due to the large size of the schema. In addition, sending the schema in different configurations may be necessary in certain instances.

SUMMARY OF THE INVENTION

The encoding and distribution of schema for multimedia content descriptions are described. Before the schema is sent to a system for use, it is encoded by assigning a first token for each component in the schema and a second token for each attribute of each component. In one aspect, a signifier is sent first to signal that the schema is to be sent in a particular format. In one aspect, the schema is sent as a whole entity first. In another aspect, some of the components of the schema are sent first, followed by the schema that refers to these components. In another aspect, the schema is sent first, followed by a set of component types. When the decoder receives the signifier and encoded schema, it looks up values for the first and second tokens in a look up table for all components and attributes to decode the schema.

BRIEF DESCRIPTION OF THE DRAWINGS

The present invention is illustrated by way of example, and not limitation, in the figures of the accompanying drawings in which:

FIG. 7 illustrates one embodiment of a small schema;

FIG. 8 illustrates a flattened version of the schema shown in FIG. 7;

DETAILED DESCRIPTION

Figure 1:
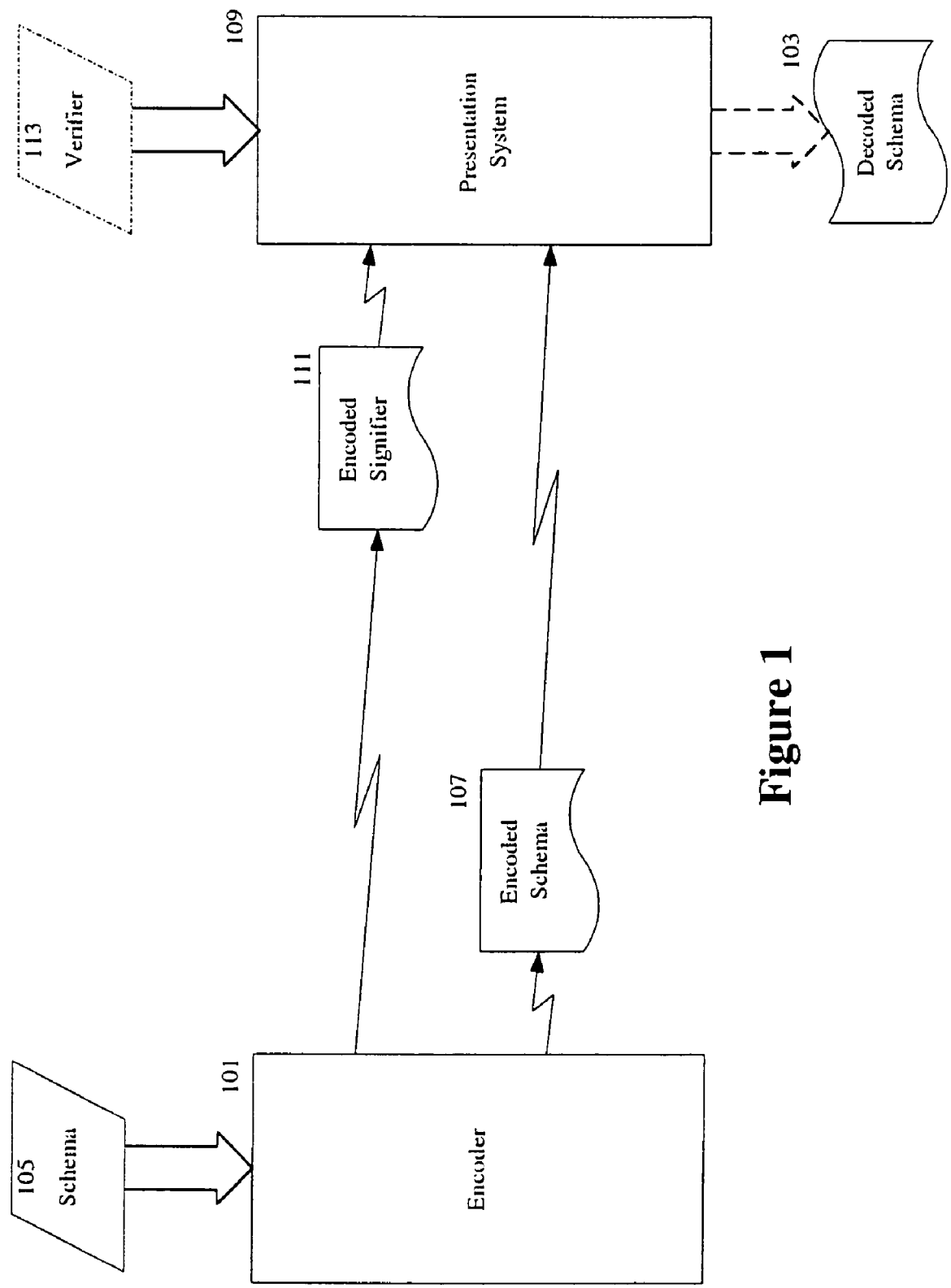
FIG. 1 illustrates a block of a system-level overview of the operation of one embodiment of the invention.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A system level overview of the operation of an embodiment of the invention is described by reference to FIG. 1. An encoder 101 receives a schema 105 for content descriptions that describe multimedia content. The encoder 101 encodes the schema 105 and sends it to a presentation system 109 for use in interpreting the corresponding content descriptions. The schema 105 may be sent in various formats.

In one embodiment, the schema 105 is sent as a whole entity, with all its components inline within the schema 105. In an alternative embodiment, some of the components of the schema 105 are sent at the beginning, followed by the schema 105 that refers to these components at the end. In another alternative embodiment, the schema 105 is sent, followed by a set of component types.

In one embodiment, the encoder 101 sends out an encoded signifier 111 to signal to the presentation system 109 in which format the schema 105 will be sent. In one embodiment, the encoded signifier 111 is a header sent as a precursor along with the schema. In an alternative embodiment, the encoded signifier 111 may be a separate stand-alone signal.

In the embodiment where the encoded signifier 111 is a header, an 8-bit mask may be used for the header. The 8-bit header may be represented as follows, "xxxx xxxx" where each "x" represents a position. For example, the positions are represented as [8765 4321]. Starting from the most significant bit (8), the following definitions based on the way the bits are masked, would indicate what predetermined aspect of the schema 105 would be sent:

Position 8: The entire schema is sent as a whole entity.
Position 7: Some of the components are sent at the beginning followed by the schema.
Position 6: The schema is sent, followed by a set of components.
Position 5: Addition of components.
Position 4: Updating components.
Position 3: Deletion of a component.
Position 2: Reserved.
Position 1: Extension Bit, signifies that another 8-bit mask is going to follow.

For example, a mask such as "0101 0000" signifies that some of the schema components are sent at the beginning followed by the schema, and addition of certain components is going to occur later. The least significant bit (1), which is "0", indicates that no other header/mask is going to follow.

Referring back to FIG. 1, once the encoded signifier 111 is sent, the encoder 101 encodes the schema 105. The encoder 101 then sends the encoded schema 107 to the presentation system 109. The encoded schema 107 is decoded by the presentation system 109.

In one embodiment, the presentation system 109 may receive a verifier 113 so that the presentation system 109 can verify the encoded schema 107 after decoding it. In an alternative embodiment, a verifier 113 is not sent, and verification of the encoded schema 107 is done internally by the presentation system 109. Since the verifier 113 is optional, the verifier 113 in FIG. 1 is represented with broken lines. Additionally, one of skill in the art will immediately recognize that the encoded schema 107 can be stored on still another system that transmits the encoded schema 107 to the presentation system 109 upon request.

Figure 2:
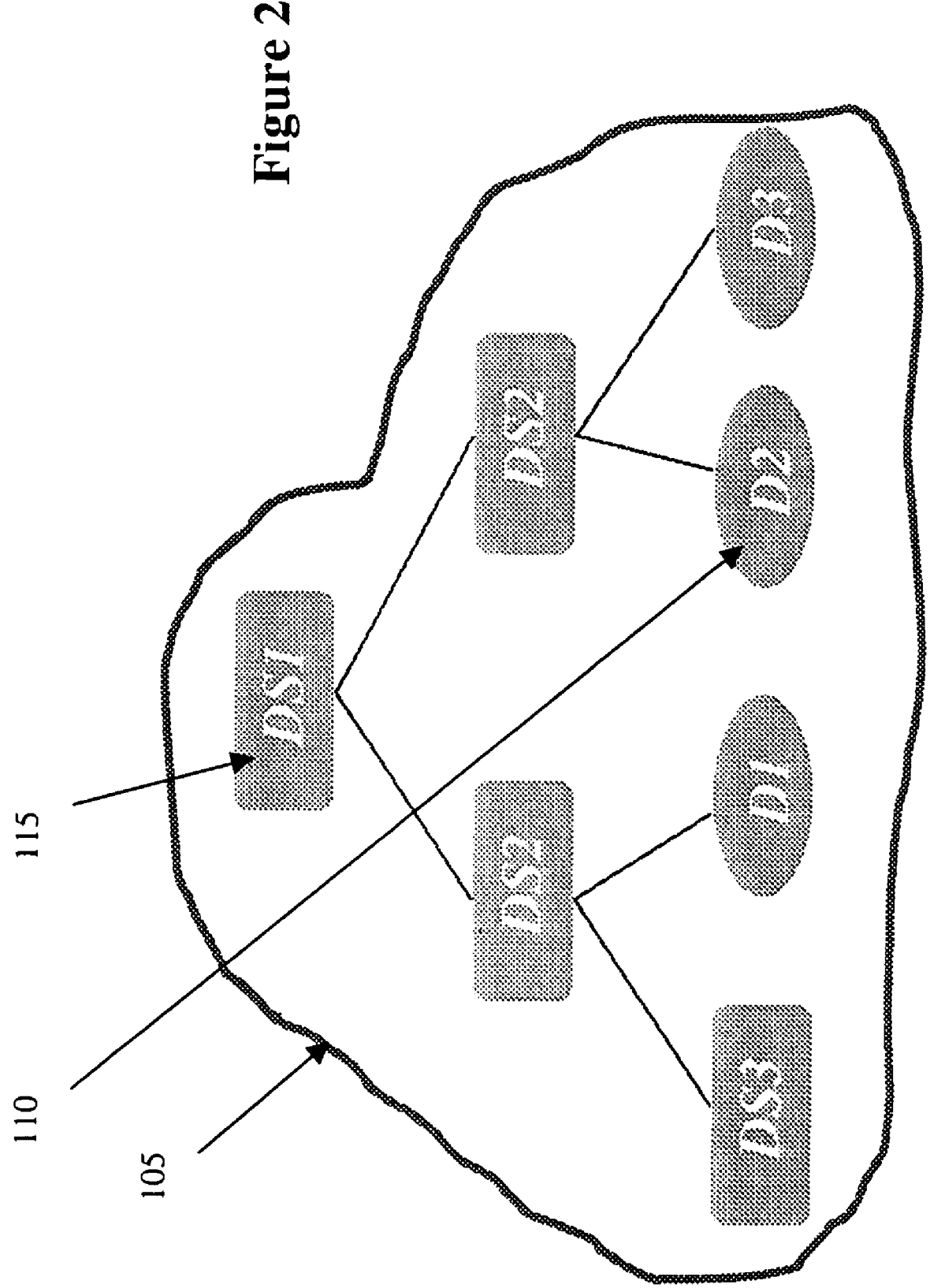
FIG. 2 illustrates a block diagram of one embodiment of a schema.

FIG. 2 illustrates a block diagram of one embodiment of a schema 105. The purpose of a schema is to define a class of descriptors and description schemes, for a particular multimedia component. In FIG. 2, the schema 105 is illustrated as encompassing several descriptors 110 and description schemes 115. The schema 105 serves as an outside wrapper to the descriptors 110 and description schemes 115.

One or more description schemes 115 describing the syntax of multimedia content are designated as "context nodes" within the schema 105. The schema 105 may be a collection of separate context node schemas, each defining one of the context nodes in the multimedia content description. The separate context node schemas enable the re-use of context node definitions to describe content of varying structures. The context node schema identifies the required and optional elements and attributes of the context node and the maximum number of its children elements and their attributes that may be present in an instance document.

Figure 3:
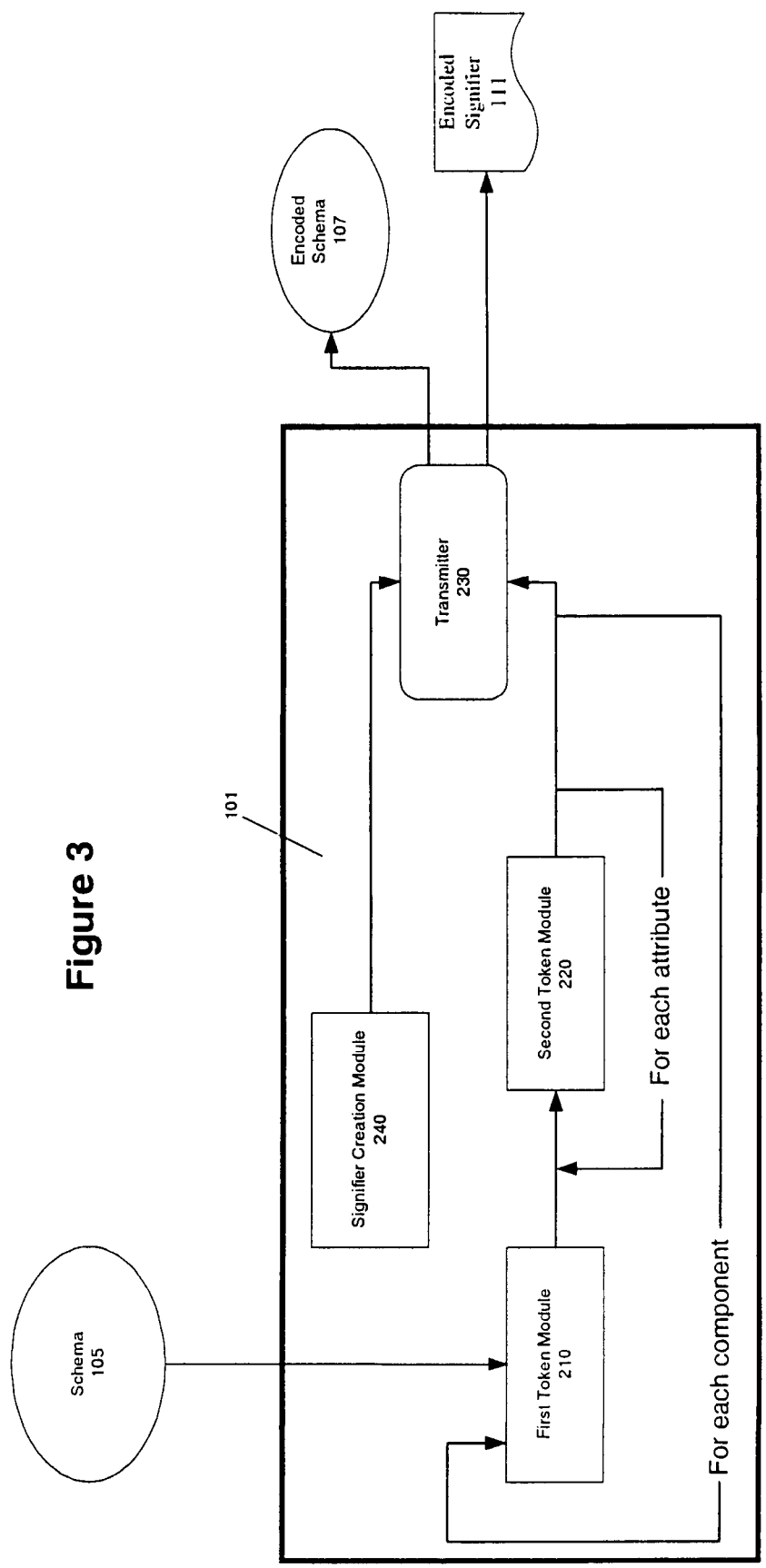
FIG. 3 illustrates a block diagram of one embodiment of an encoder.

FIG. 3 illustrates a block diagram of one embodiment of an encoder 101. The encoder 101 includes a first token module 210, a second token module 220, and a transmitter 230. The first token module 210 receives the schema 105 and assigns a first token code for each component in the schema. Each schema has one or more components, which is shown in FIG. 3. Each component may have one or more attributes. The second token module 220 then receives the output from the first token module 210 and assigns a second token code for each attribute of one component. After the first token codes and second token codes have been assigned for a particular component followed by termination codes, this is looped for all the remaining components and then, the transmitter 230 transmits the encoded schema 107 to a decoder.

In one embodiment, the encoder 101 also includes a signifier creation module 240. The signifier creation module 240 creates a signifier to signal to the presentation system 109 what combination of the schema 105 will be sent. The signifier creation module 240 sends the signifier to the transmitter 230, which sends the encoded signifier 111 to the decoder. In one embodiment, the decoder has access to a look up table in order to look up values corresponding to the first token codes and second token codes. The decoder 430 is discussed below with reference to FIG. 4.

Figure 4:
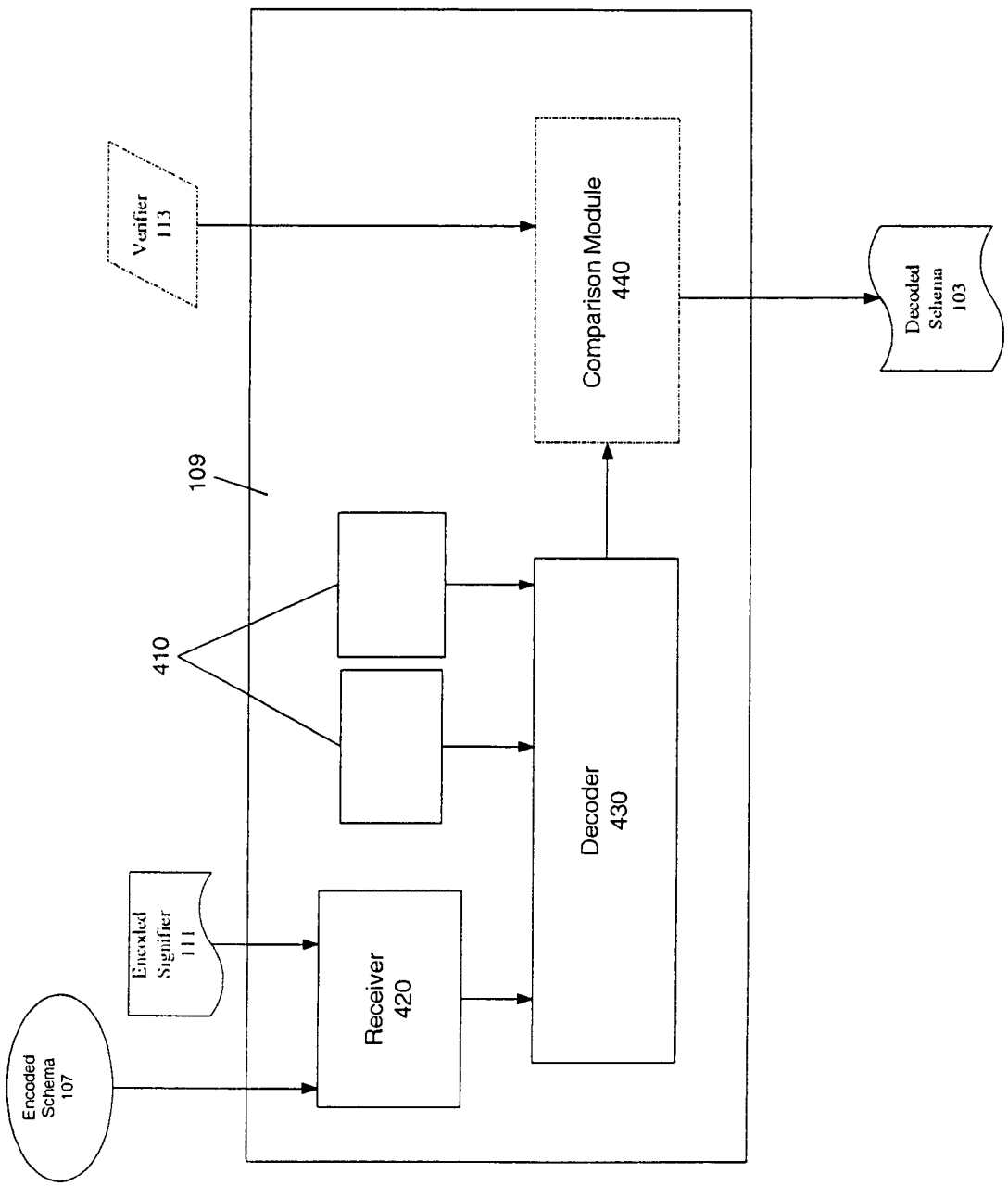
FIG. 4 illustrates a block diagram of one embodiment of a presentation system.

FIG. 4 illustrates a block diagram of one embodiment of a presentation system 109. The presentation system 109 includes a receiver 420, a decoder 430, a comparison module 440, and one or more look up tables 410. The receiver 420 receives the encoded signifier 111. From the encoded signifier 111, the presentation system 109 is able to determine what combination of the schema is going to be received by the presentation system 109. The receiver 420 then receives the encoded schema 107. The receiver 420 passes the encoded schema 107 to the decoder 430.

Figure 6:
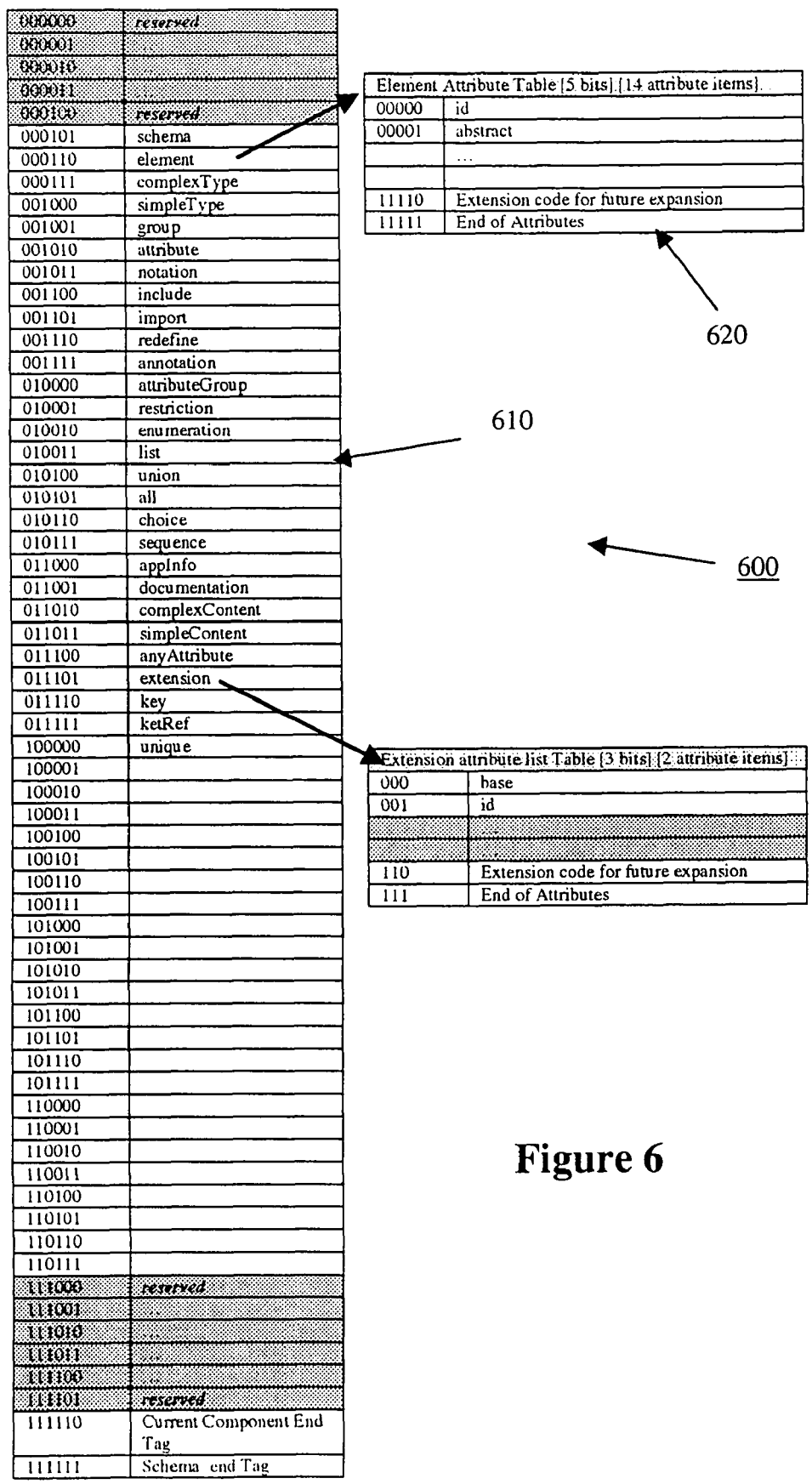
FIG. 6 illustrates one embodiment of a lookup table.

The decoder 430 decodes the encoded schema 107. In one embodiment, the decoder 430 has access to look up tables 410 in order to look up values corresponding to the first token codes, second token codes and termination codes used to encode the schema. Examples of lookup tables are shown in FIG. 6. After the decoder 430 has decoded the encoded schema 107, the decoder 430 passes the decoded schema information to the comparison module 440. In one embodiment, the comparison module 440 also receives a verifier 113, represented in FIG. 4 as an optional component in broken lines. The comparison module 440 compares the decoded schema with the verifier 113. The presentation system 109 then outputs a decoded schema 103.

Figure 5:
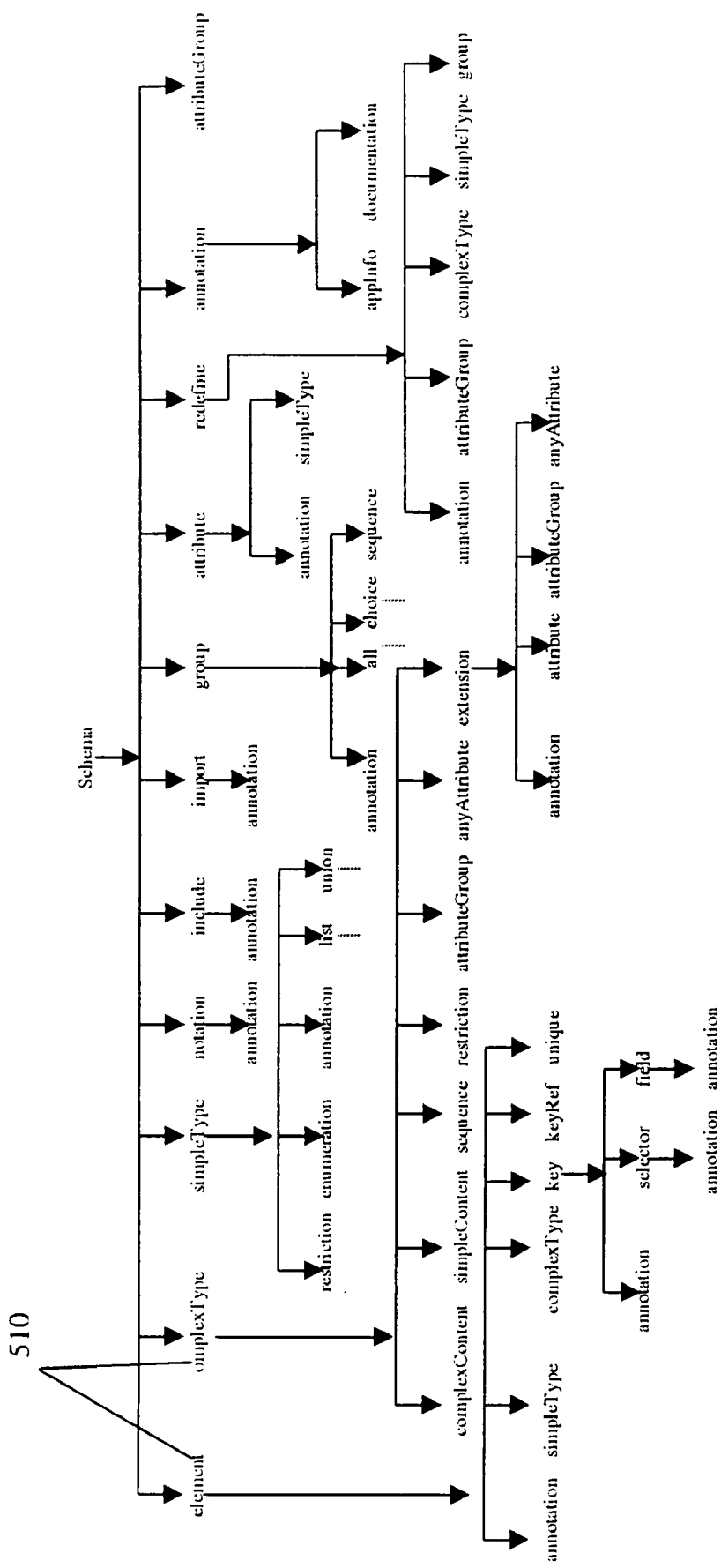
FIG. 5 illustrates one embodiment of a schema hierarchy diagram.

FIG. 5 illustrates a schema hierarchy diagram. The schema hierarchy diagram was generated by studying the XML schema structures of world wide web consortium (W3C) and MPEG7 schemas. FIG. 5 shows a schema broken down into its components 510. The schema hierarchy diagram of FIG. 5 shows that there are approximately 31 terms present which are unique.

FIG. 6 illustrates one embodiment of a lookup table 600 that holds values corresponding to the components 510 shown in the schema hierarchy diagram of FIG. 5. In one embodiment, the components 510 are assigned first token codes, and each first token code is a 6-bit field. The components 510 and associated first token codes are contained in one component table 610. As seen in FIG. 6, the component "element" is represented by the first token code "000110".

For each component 510, the lookup table 600 also includes an attribute table 620. In one embodiment for the element component type, the attribute table 620 includes 14 attribute items. Each attribute is represented by a second token code. In one embodiment, the second token code is a 5-bit field. As seen in FIG. 6, the component "element" has an attribute table 620. In the attribute table 620, several attributes are listed with associated second token codes. For example, the attribute "abstract" is assigned a second token code "00001".

In one embodiment, in each attribute table 620, one of the two last attribute items is reserved for an extension signifier. The extension signifier is used to define an instance where further attribute or components are to follow. In one embodiment, in each attribute table 620, one of the last two attribute items is reserved for an end attribute signifier to signify the end of the attribute items for that particular component type 510.

FIG. 7 illustrates one embodiment of a small schema 705. FIG. 8 illustrates a flattened version of the schema 705 shown in FIG. 7. In FIG. 8, the schema 705 is broken down into components 810 and text-values for those components 820. First token codes for the components 810 are represented as number values. Values of the schema 605 could be encoded as text strings in one embodiment. In an alternative embodiment, they may be encoded using some other method such as Ziv-Lempel.

Figure 9:
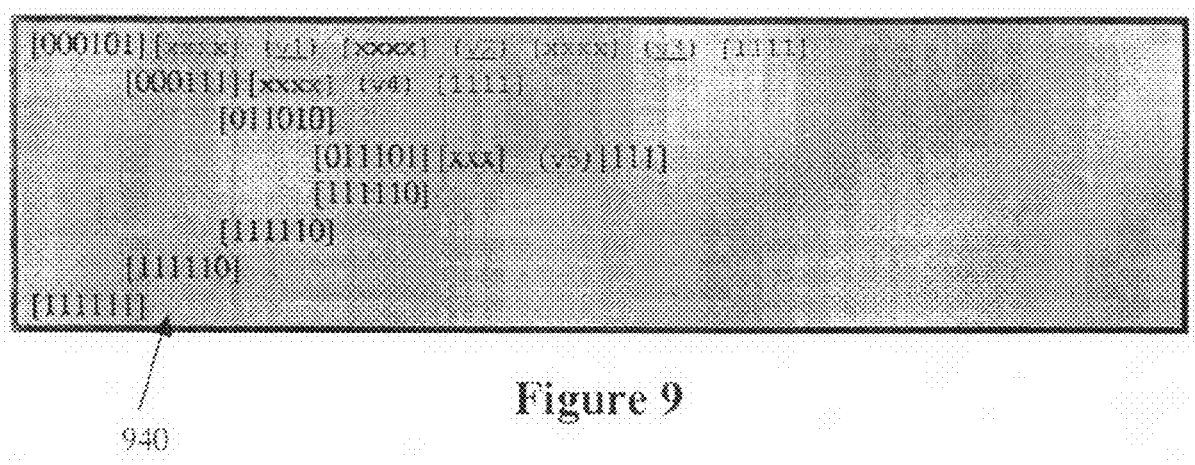
FIG. 9 illustrates a binarized version of the schema of FIGS. 7 and 8.

Referring to FIG. 8, in one example, the component "Mpeg7RootType" may be transmitted later. In such a case, an 8-bit header represented by bit-mask "0010 0000" is sent first. Immediately following the header, first token codes for components and second token codes for attributes follow. FIG. 9 illustrates a binarized version 940 of the schema 705 of FIGS. 7 and 8.

In one embodiment, a second lookup table can be created for all the namespaces of descriptors and description schemes. Tokens are assigned to values like mpeg7: Mpeg7RootType in the above schema 605. This further increases the compression achieved.

Figure 10:
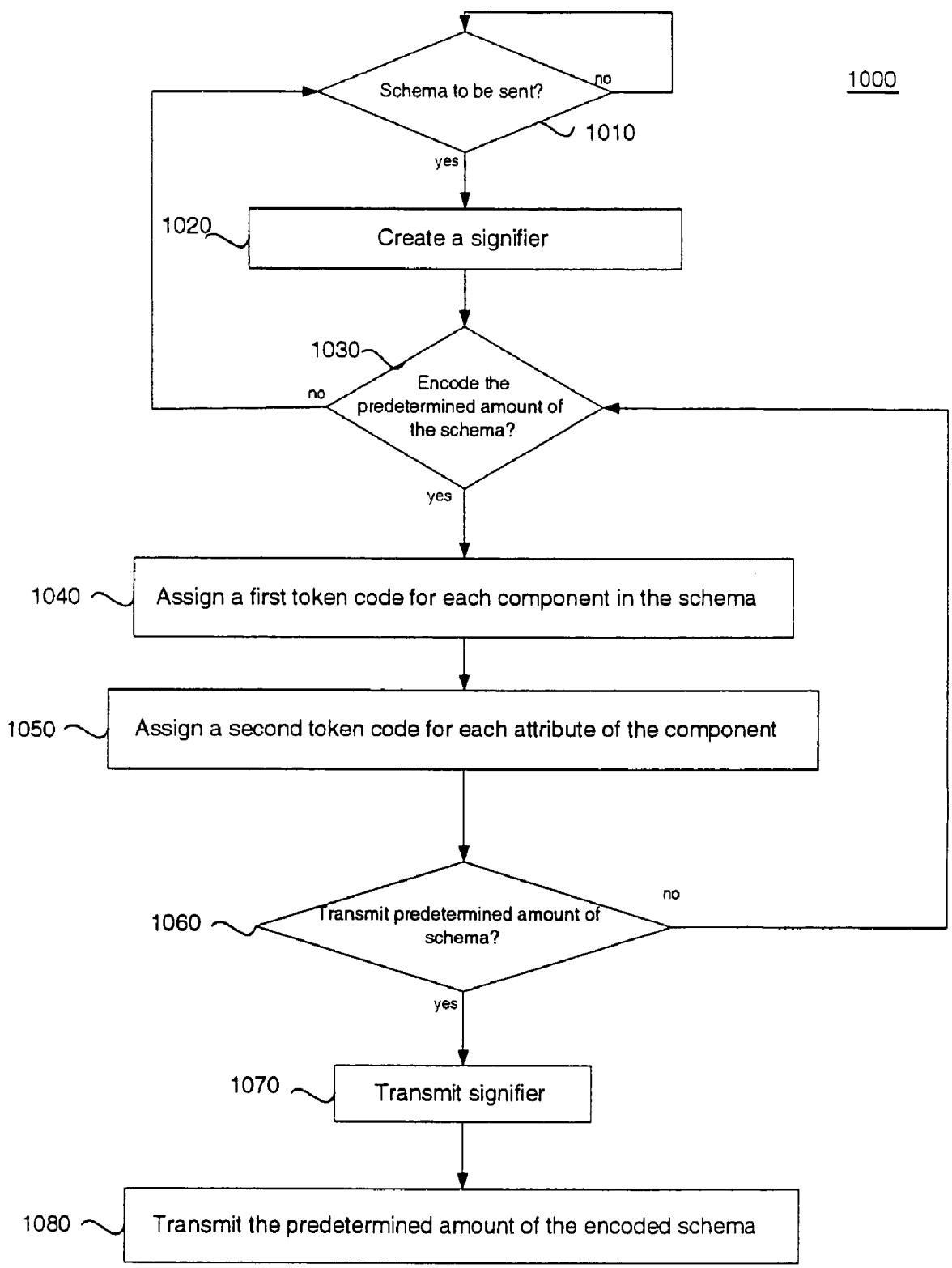
FIG. 10 illustrates a flow diagram of one embodiment of a process of encoding and distributing a schema for content description.

FIG. 10 illustrates a flow diagram of one embodiment of a process of encoding and distributing a schema for content description 1000. At processing block 1010, it is determined whether a schema is to be sent. If yes, the process moves to processing block 1020.

At processing block 1020, processing logic creates a signifier. At processing block 1030, it is determined whether a predetermined amount of the schema to be sent is to be encoded. If no, the process moves back to processing block 1010. If yes, the process moves to processing block 1040.

At process block 1040, to encode a schema, processing logic assigns a first token code for each component in the schema. The first token codes are used to look up corresponding component values in a lookup table at a decoder where the predetermined amount of the schema is received. At processing block 1050, processing logic assigns a second token code for each attribute of each component. The second token codes are used to look up corresponding attribute values in the lookup table at the decoder side.

At processing block 1060, it is determined whether the predetermined amount of schema should be sent. If no, the processing moves back to processing block 1030. If yes, the process moves to processing block 1070.

At processing block 1070, processing logic transmits the signifier to signal that a predetermined amount of the schema is to be sent. At processing block 1080, processing logic transmits the predetermined amount of the encoded schema in a particular format.

Figure 11:
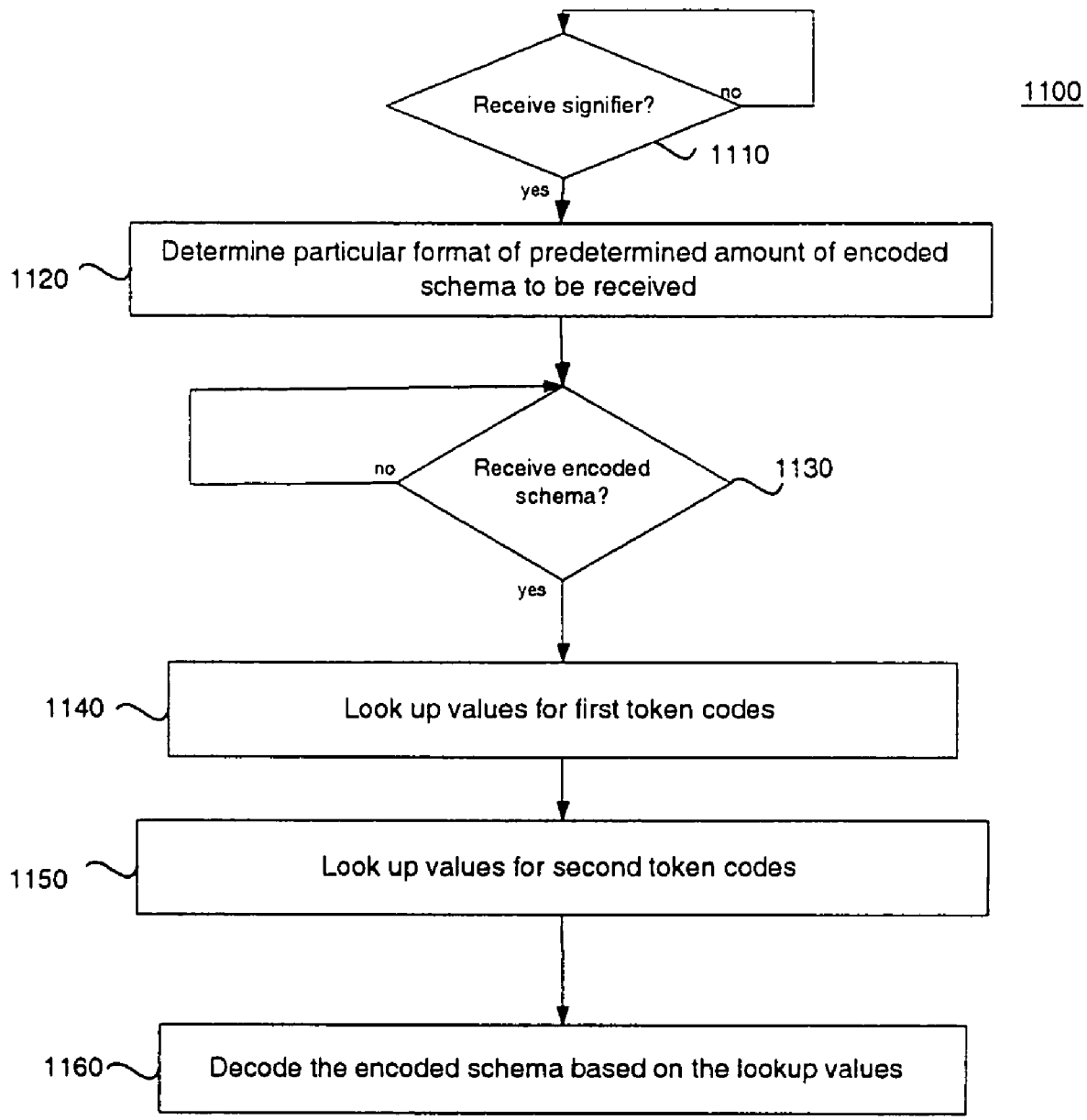
FIG. 11 illustrates a flow diagram of one embodiment of a process of receiving and decoding a schema for content description.

FIG. 11 illustrates a flow diagram of one embodiment of a process of receiving and decoding a schema for content description 1100. At processing block 1110, it is determined if a signifier has been received. If yes, the process moves to processing block 1120.

At processing block 1120, from the signifier, processing logic determines that a predetermined amount of encoded schema is to be received in a particular format following the signifier. At processing block 1130, it is determined if that encoded schema is received. If yes, the process moves to processing block 1140.

At processing block 1140, processing logic looks up values for first token codes assigned to components of the schema. At processing block 1150, processing logic looks up values for second token codes assigned to attributes of the components. At processing block 1160, processing logic decodes the encoded schema based on the lookup values.

It will be appreciated that that more or fewer processes may be incorporated into the method(s) illustrated in FIGS. 10 and 11 without departing from the scope of the invention and that no particular order is implied by the arrangement of blocks shown and described herein. It further will be appreciated that the method(s) described in conjunction with FIGS. 10 and 11 may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Figure 12:
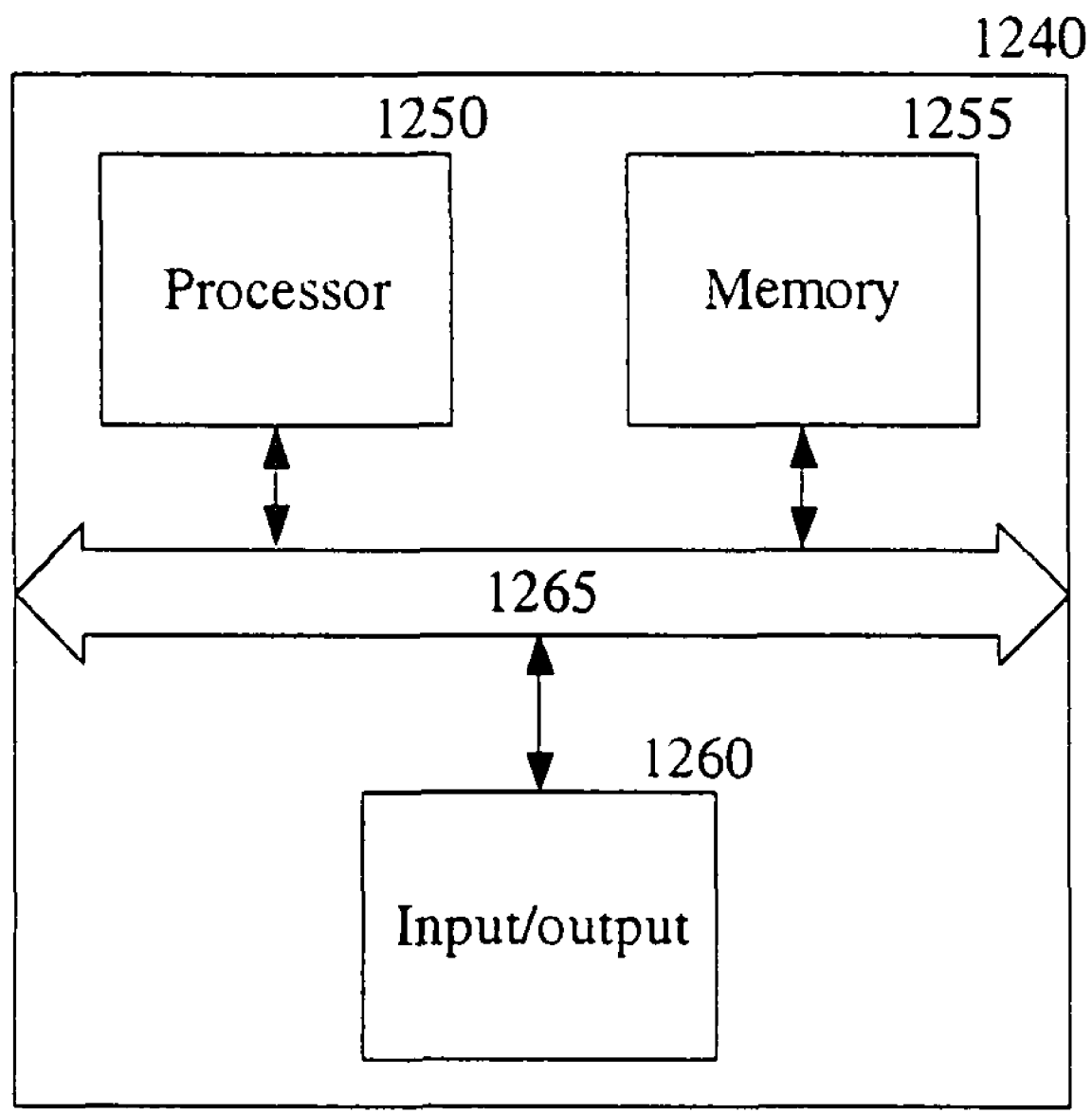
FIG. 12 illustrates one embodiment of a computer system.

One embodiment of a computer system suitable for use as the encoder 101 and/or presentation system 109 of FIG. 1 is illustrated in FIG. 12. The computer system 1240, includes a processor 1250, memory 1255 and input/output capability 1260 coupled to a system bus 1265. The memory 1255 is configured to store instructions which, when executed by the processor 1250, perform the methods described herein. The memory 1255 may also store the input and currently edited video content. Input/output 1260 provides for the delivery and display of the video content or portions or representations thereof Input/output 1260 also encompasses various types of computer-readable media, including any type of storage device that is accessible by the processor 1250. One of skill in the art will immediately recognize that the term "computer-readable medium/media" further encompasses a carrier wave that encodes a data signal. It will also be appreciated that the server is controlled by operating system software executing in memory 1255. Input/output and related media 1260 store the computer-executable instructions for the operating system and methods of the present invention as well as the video content.

The description of FIG. 12 is intended to provide an overview of computer hardware and other operating components suitable for implementing the invention, but is not intended to limit the applicable environments. It will be appreciated that the computer system 1240 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Although the present invention has been described with reference to specific embodiments, the specification and drawings are to be regarded as illustrative rather than restrictive.

What is claimed is:

1. A method of receiving and decoding an encoded schema for content descriptions comprising:
   receiving, by a processor, a header comprising a signifier to signal that the encoded schema is to be received in a particular format following the signifier, the header comprising an eight-bit mask having eight positions to define the particular format, wherein a first position indicates that the encoded schema is to be received as a whole entity;
   receiving a predetermined amount of the encoded schema in the particular format; and
   decoding the encoded schema, wherein the schema is used in interpreting the corresponding content descriptions.

2. The method of claim 1 further comprising:
   looking up a value for a first token code and a second token code in the encoded schema, wherein the values are found in a lookup table; and
   decoding the encoded schema based on the lookup table values.

3. The method of claim 2 wherein the first token code corresponds to a component in the schema.

4. The method of claim 3 wherein the second token codes corresponds to an attribute of the component in the schema.

5. The method of claim 2 wherein the first token code comprises a six bit field.

6. The method of claim 2 wherein a bit-field length of the second token code depends on a maximum number of attributes of the corresponding component.

7. The method of claim 2 wherein a second token code indicates an extension of the corresponding attribute.

8. The method of claim 7 wherein a second token code indicates an attribute end.

9. The method of claim 2 wherein a first token code indicates a component end.

10. The method of claim 2 wherein a first token code indicates a schema end code.

11. The method of claim 1 wherein a second position in the eight bit mask indicates that some components are to be received first followed by the encoded schema.

12. The method of claim 1 wherein a third position in the eight bit mask indicates that the schema is to be received first, followed by a set of components.

13. The method of claim 1 wherein a fourth position in the eight-bit mask indicates component addition information is to be received.

14. The method of claim 1 wherein a fifth position in the eight-bit mask indicates component update information is to be received.

15. The method of claim 1 wherein a sixth position in the eight-bit mask indicates component deletion information is to be received.

16. The method of claim 1 wherein an eighth position in the eight-bit mask indicates that another header is to be received.

17. A non-transitory machine-readable medium having executable instructions to cause a computer to perform a method comprising:
   receiving a header comprising a signifier to signal that an encoded schema for content descriptions is to be received in a particular format following the signifier, the header comprising an eight-bit mask having eight positions to define the particular format, wherein a first position indicates that the encoded schema is to be received as a whole entity;
   receiving a predetermined amount of the encoded schema in the particular format; and
   decoding the encoded schema, wherein the schema is used in interpreting the corresponding content descriptions.

18. The non-transitory machine-readable medium of claim 17 further comprising:
   looking up a value for a first token code and a second token code in the encoded schema, wherein the values are found in a lookup table; and
   decoding the encoded schema based on the lookup table values.

19. A computer system comprising:
   a processing unit;
   a memory coupled to the processing unit through a system bus;
   a computer-readable medium coupled to the processing unit through the system bus; and
   a receiving and decoding of an encoded schema for content description program executed from the computer-readable medium by the processing unit, wherein the encoding and distribution program causes the processing unit to receive a header comprising a signifier to signal that a schema for content descriptions is to be received in a particular format following the signifier, the header comprising an eight-bit mask having eight positions to define the particular format, wherein a first position indicates that the encoded schema is to be received as a whole entity, to receive a predetermined amount of the encoded schema in the particular format, and to decode the encoded schema, wherein the schema is used in interpreting the corresponding content descriptions.

20. The computer system of claim 19 wherein the receiving and decoding of an encoded schema for content description system program further causes the processing unit to look up a value for a first token code and a second token code in the encoded schema, wherein the values are found in a lookup table, and to decode the encoded schema based on the lookup table values.

21. The computer system of claim 20 wherein the first token code corresponds to a component in the schema.

22. The computer system of claim 21 wherein the second token code corresponds to an attribute of the component.

* * * * *